(12) United States Patent
Stamps et al.

(10) Patent No.: US 10,933,984 B2
(45) Date of Patent: Mar. 2, 2021

(54) HUB MOUNTED VIBRATION REDUCTION SYSTEM FOR COAXIAL ROTOR SYSTEMS

(71) Applicant: Bell Helicopter Textron Inc., Fort Worth, TX (US)

(72) Inventors: Frank Bradley Stamps, Colleyville, TX (US); Eric Gonzalez, Fort Worth, TX (US); Michael R. Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 286 days.

(21) Appl. No.: 16/035,358

(22) Filed: Jul. 13, 2018

(65) Prior Publication Data

US 2020/0017203 A1    Jan. 16, 2020

(51) Int. Cl.
*B64C 27/00* (2006.01)
*B64C 27/10* (2006.01)

(52) U.S. Cl.
CPC ............ *B64C 27/001* (2013.01); *B64C 27/10* (2013.01); *B64C 2027/003* (2013.01)

(58) Field of Classification Search
CPC . B64C 27/001; B64C 27/10; B64C 2027/003; B64C 2027/7233; B64C 11/008
See application file for complete search history.

(56) References Cited

U.S. PATENT DOCUMENTS

| | | | | |
|---|---|---|---|---|
| 10,562,617 | B2 * | 2/2020 | Choi | B64C 29/0033 |
| 2008/0253891 | A1 * | 10/2008 | Cabrera | B64C 27/10 |
| | | | | 416/134 A |
| 2010/0003133 | A1 * | 1/2010 | Welsh | B64C 27/10 |
| | | | | 416/1 |

(Continued)

FOREIGN PATENT DOCUMENTS

| EP | 2803570 A1 | 11/2014 |
|---|---|---|
| EP | 2829471 A1 | 1/2015 |

(Continued)

OTHER PUBLICATIONS

European Exam Report in related European Patent Application No. 18195829.9 dated Nov. 5, 2019, 4 pages.

(Continued)

*Primary Examiner* — Rodney A Bonnette
(74) *Attorney, Agent, or Firm* — Lightfoot & Alford PLLC

(57) ABSTRACT

Systems and methods include providing a coaxial helicopter with a main rotor system having an upper rotor system, a coaxial counter-rotating lower rotor system, and a rotor mast assembly having an upper rotor mast and a coaxial counter-rotating lower rotor mast. The upper rotor system and an associated upper vibration reduction system are coupled to the upper rotor mast. The upper vibration reduction system provides in-plane vibration control and reduction to the upper rotor system. The lower rotor system and an associated lower vibration reduction system are coupled to the lower rotor mast. The lower vibration reduction system provides in-plane vibration control and reduction to the lower rotor system. A third vibration reduction system is coupled to the rotor mast assembly and cooperates with the upper and lower vibration reduction systems to provide total in-plane vibration control and reduction to the main rotor system.

20 Claims, 11 Drawing Sheets

(56) References Cited

U.S. PATENT DOCUMENTS

2017/0152035 A1\* 6/2017 Zhao .................... B64C 27/08
2017/0327217 A1\* 11/2017 Laitenberger .......... B64C 27/10
2019/0023382 A1\* 1/2019 Welsh .................. B64C 27/001

FOREIGN PATENT DOCUMENTS

| WO | 2008033884 | A2 | 3/2008 |
|----|------------|----|--------|
| WO | 2008133614 | A1 | 11/2008 |
| WO | 2016057215 | A1 | 4/2016 |

OTHER PUBLICATIONS

European Search Report in related European Patent Application No. 18195829.9 dated Apr. 5, 2019, 4 pages.
European Exam Report in related European Patent Application No. 18195829.9 dated Apr. 16, 2019, 6 pages.

\* cited by examiner

HUB MOUNTED VIBRATION REDUCTION SYSTEM FOR COAXIAL ROTOR SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In flight, aircraft are subjected to various aerodynamic forces as a result of the design, flight characteristics, and operating parameters of a particular aircraft. Environmental factors also play a role in the aerodynamic forces experienced by an aircraft. Rotorcraft are particularly sensitive to such aerodynamic forces since rotorcraft have not only forward flight capability, but also hover and lateral mobility capability. Thus, the aerodynamic forces on a rotorcraft change depending on the flight operation of the rotorcraft. Accordingly, rotorcraft must be designed to accommodate and respond to the various aerodynamic forces when operated to provide forward flight, hover, and lateral maneuverability.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
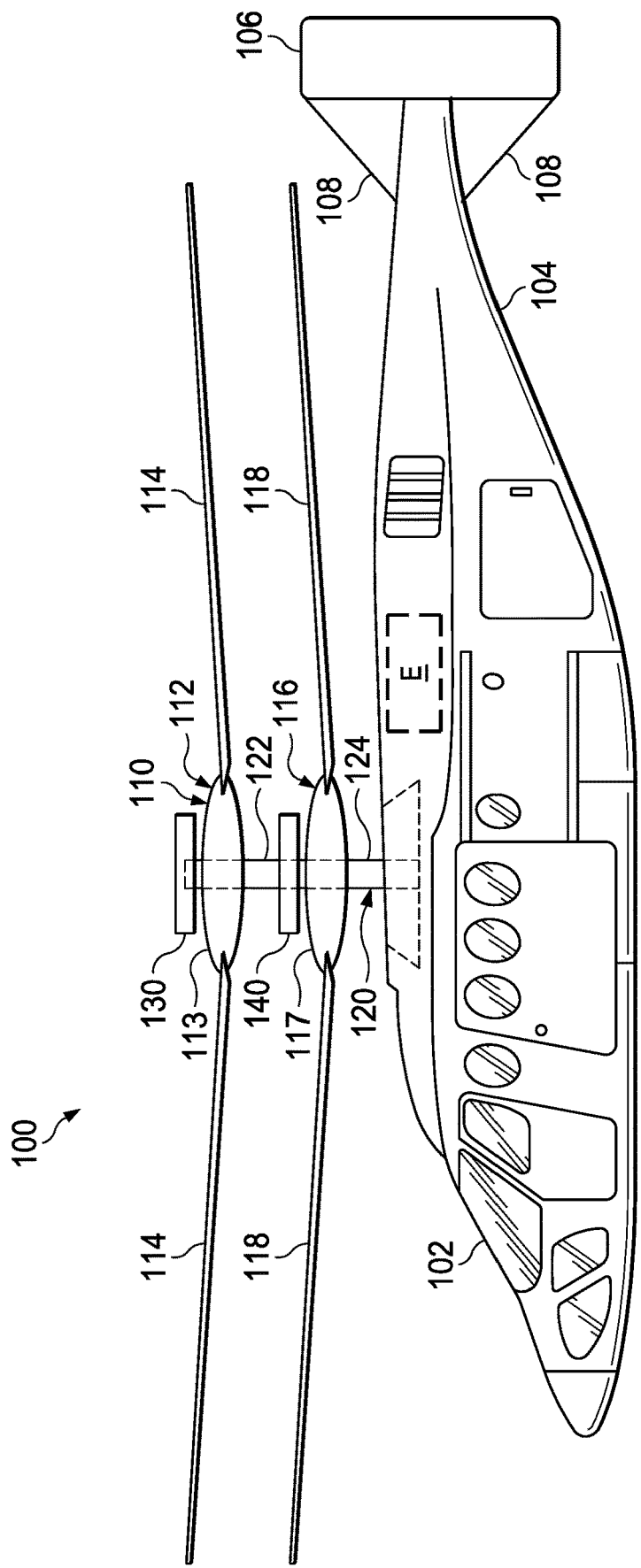
FIG. 1 is a side view of an embodiment of a coaxial helicopter.
Figure 2:
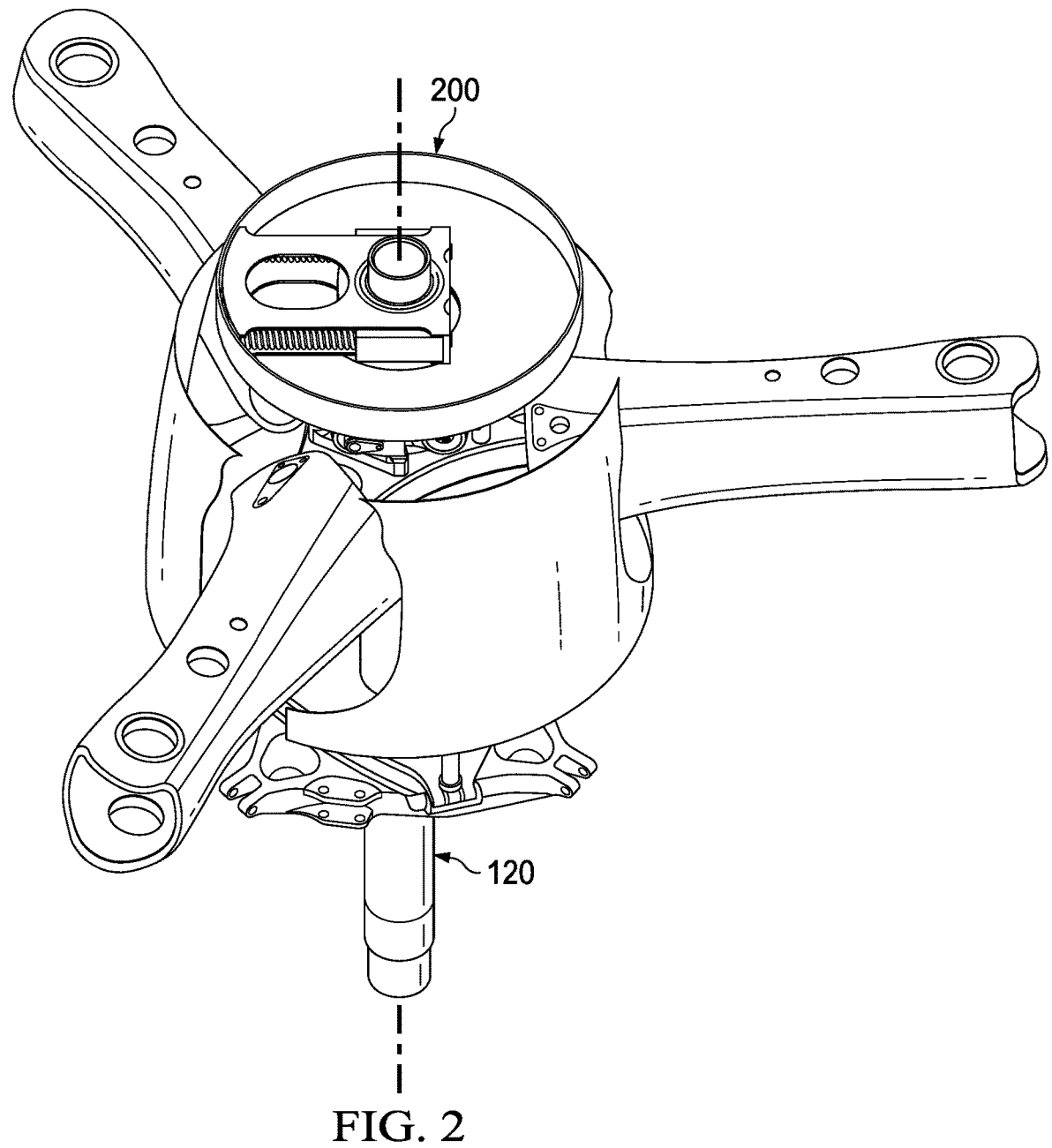
FIGS. 2 through 7 are oblique views of exemplary embodiments of vibration reduction systems of the coaxial helicopter of FIG. 1.
Figure 3:
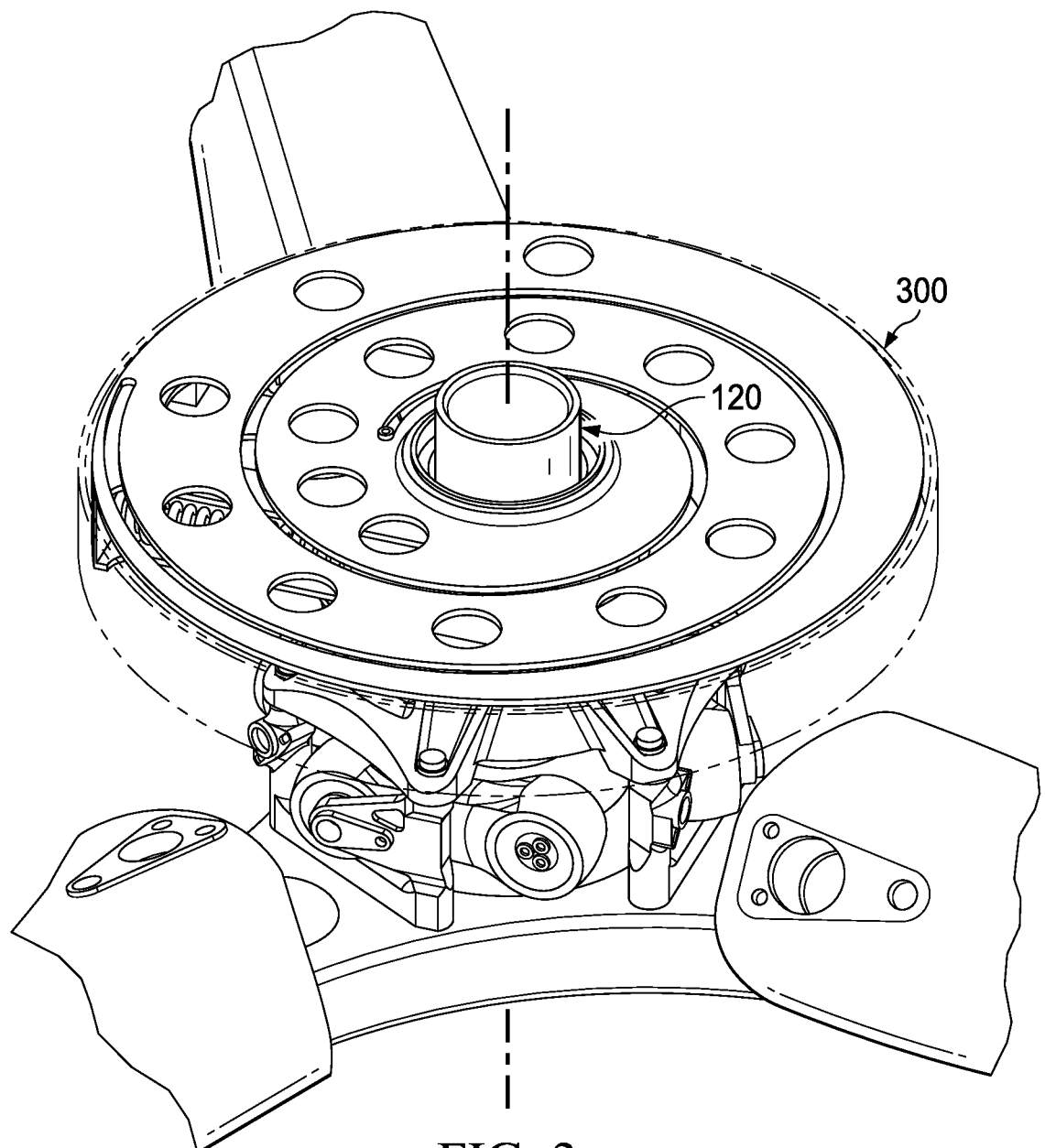
Figure 4:
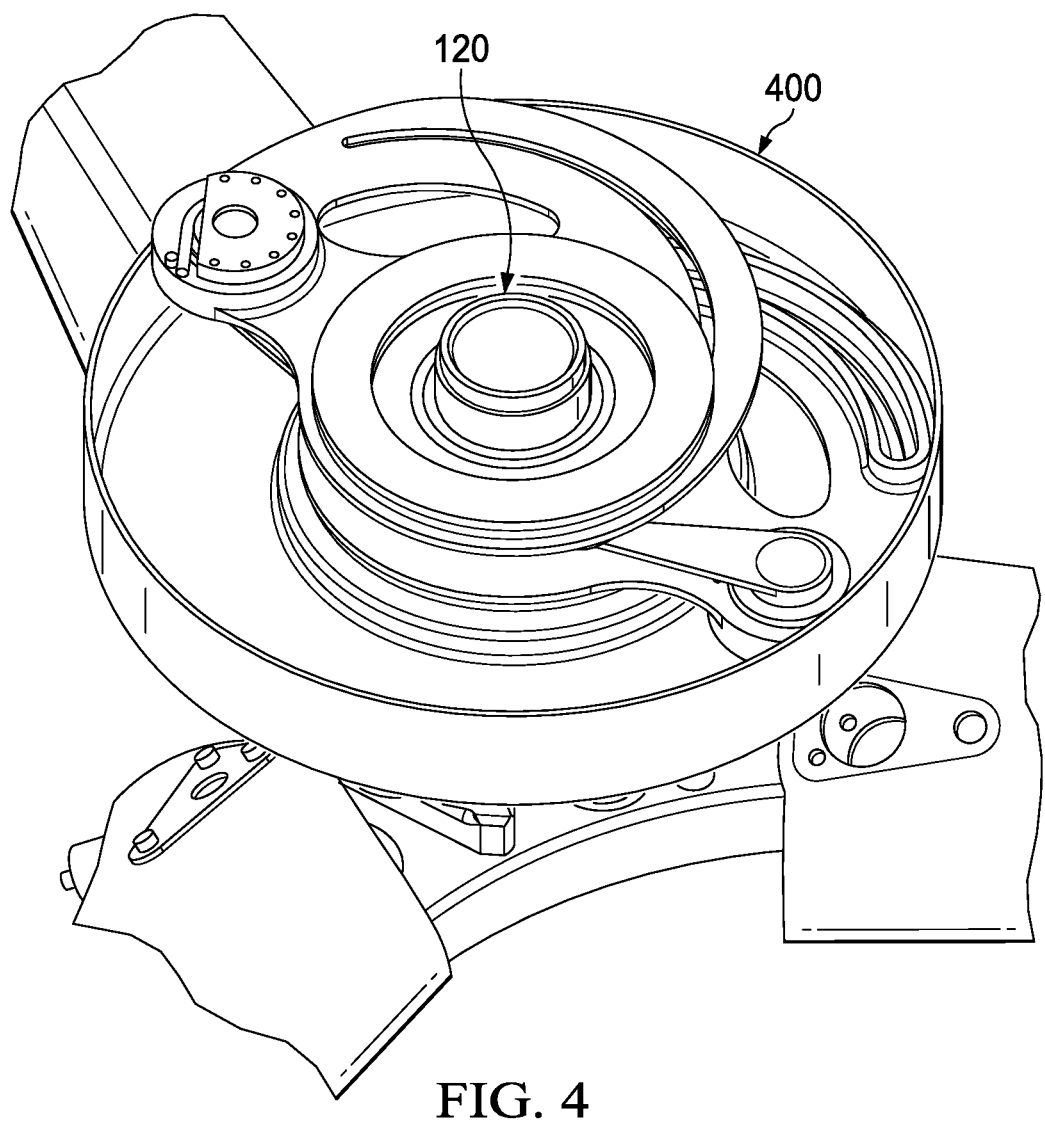
Figure 5:
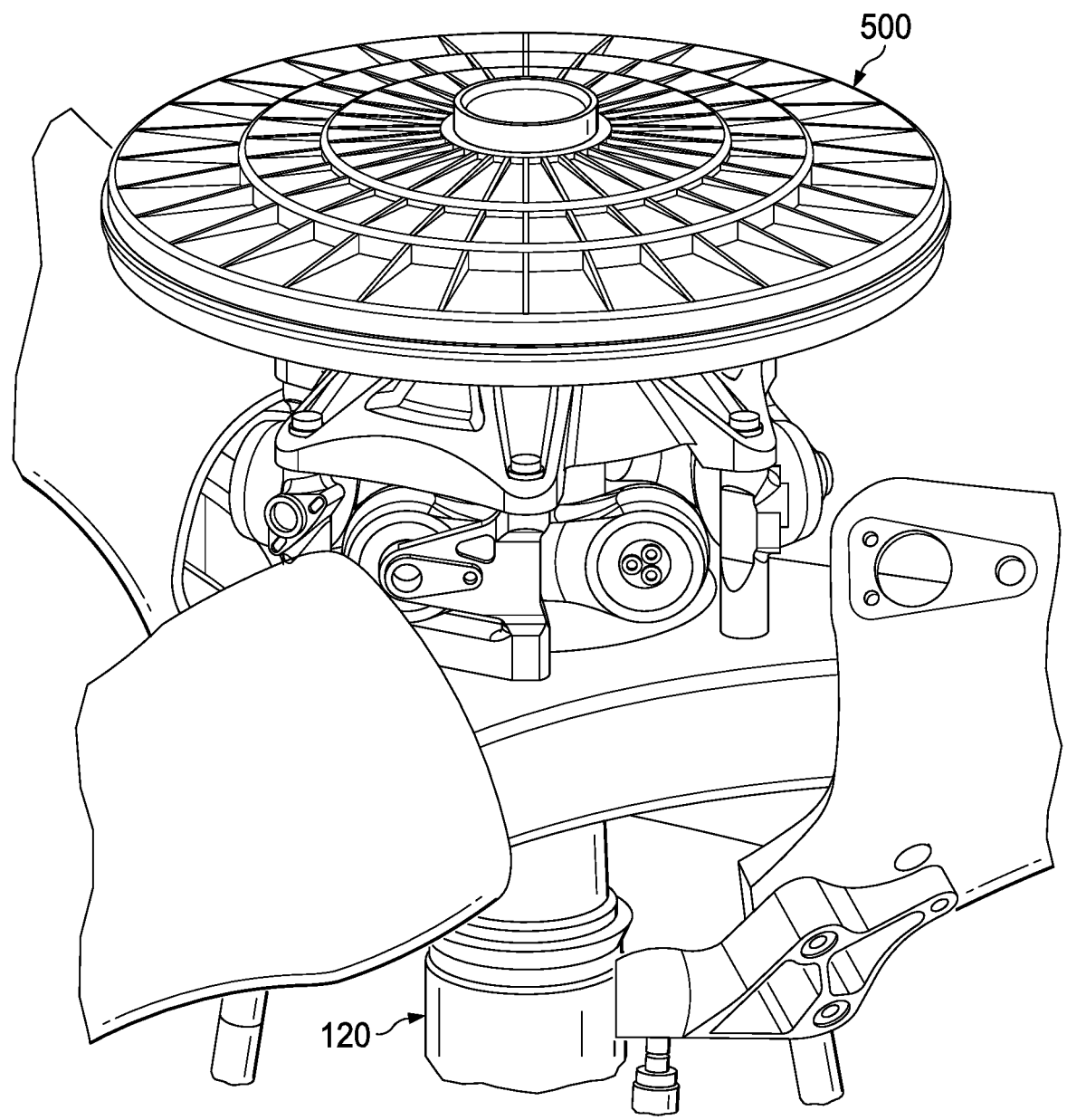
Figure 6:
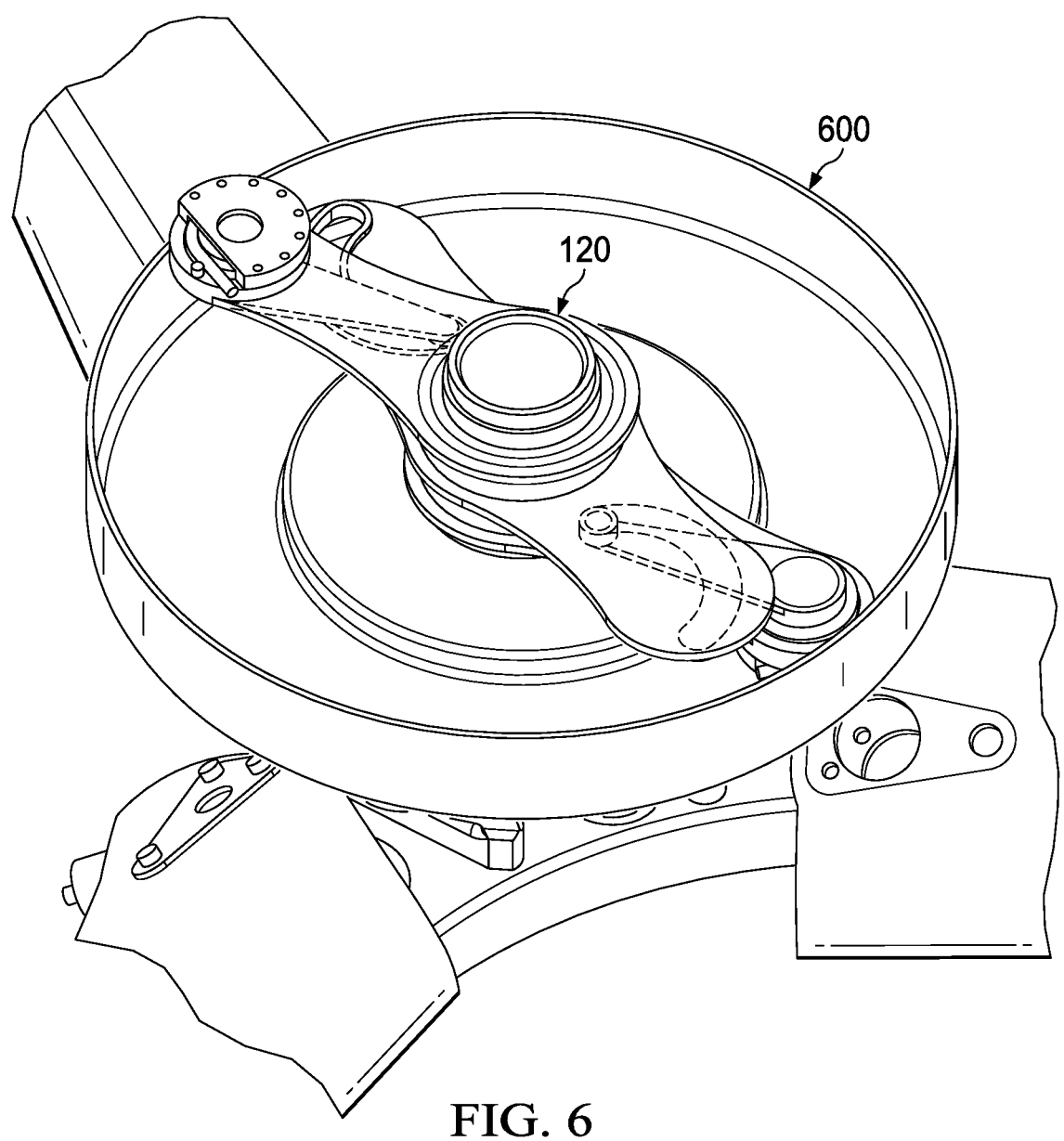
Figure 7:
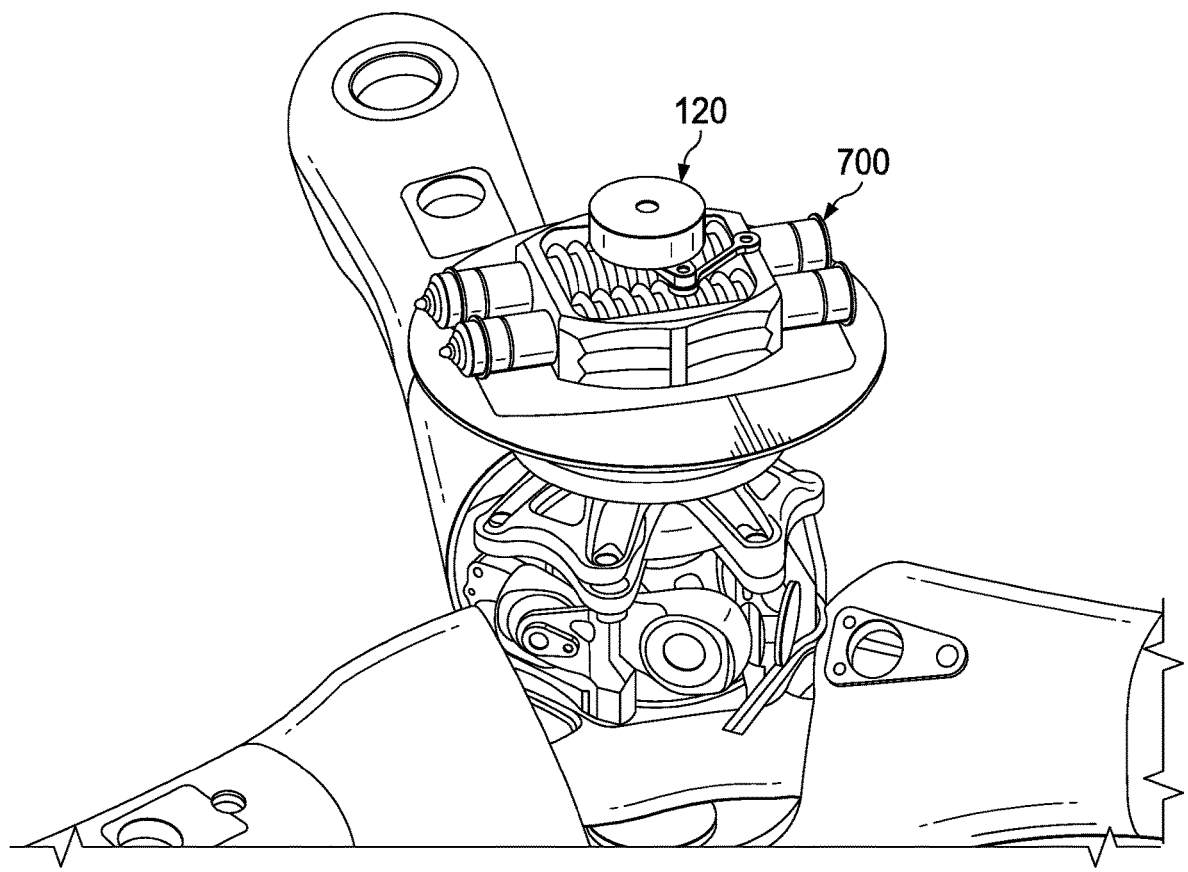

FIG. 1 is a side view of an embodiment of a coaxial helicopter 100 according to this disclosure. Coaxial helicopter 100 comprises a fuselage 102 and a tail boom or empennage 104. In the embodiment shown, the empennage 104 comprises a ducted fan 106 disposed on an aft end of the empennage 104. The ducted fan 106 is generally configured to provide forward thrust to the coaxial helicopter 100. A plurality of fan supports 108 couple the ducted fan 106 to the empennage 104 and provide support to the ducted fan 106. In some embodiments, the fan supports 108 may comprise vertical and/or horizontal stabilizers configured to provide stability to the coaxial helicopter 100 during forward flight. Coaxial helicopter 100 further comprises a main rotor system 110. Main rotor system 110 comprises an upper rotor system 112, a lower rotor system 116, and a rotor mast assembly 120 having an upper rotor mast 122 and a coaxial lower rotor mast 124. Upper rotor system 112 comprises a rotor hub 113 configured to couple a plurality of rotor blades 114 to the upper rotor mast 122 for selective rotation therewith. Lower rotor system 116 comprises a rotor hub 117 configured to couple a plurality of rotor blades 118 to the lower rotor mast 124 for selective rotation therewith. Rotor hubs 113, 117 may generally be soft in-plane or stiff in-plane. Upper rotor system 112 and the lower rotor system 116 are coaxially aligned. However, to provide anti-torque and prevent rotation of the fuselage 102, the upper rotor system 112 and associated upper rotor mast 122 rotate opposite the lower rotor system 116 and associated lower rotor mast 124.

Upper rotor system 112 also comprises an upper vibration reduction system 130 coupled to the upper rotor mast 122 and/or the rotor hub 113 of the upper rotor system 112 for rotation with the upper rotor mast 122 or relative to a fixed standpipe. Lower rotor system 116 also comprises a lower vibration reduction system 140 coupled to the lower rotor mast 124 and/or the rotor hub 117 of the lower rotor system 116 and for rotation with the lower rotor mast 124 or relative to a fixed standpipe. In the embodiment shown, upper vibration reduction system 130 is located above the rotor hub 113 of the upper rotor system 112, and lower vibration reduction system 140 is located above the rotor hub 117 of the lower rotor system 116. However, in other embodiments, one or more of the vibration reduction systems 130, 140 may be located below their respective rotor hubs 113, 117, so long as the upper vibration reduction system 130 is adjacently located to rotor hub 113, and the lower vibration reduction system 140 is adjacently located to rotor hub 117.

In operation, the upper vibration reduction system 130 and lower vibration reduction system 140 are configured to provide in-plane vibration control and reduction to the main rotor system 110. More specifically, the upper vibration reduction system 130 is configured to provide in-plane vibration control and reduction to the upper rotor system 112, while the lower vibration reduction system 140 is configured to provide in-plane vibration control and reduction to the lower rotor system 116. During flight, in-plane rotor loads acting on the rotor systems 112, 116 may cause movement of the each rotor mast 122, 124 or diversion of the rotor masts 122, 124 from their respective rotational axes. Movement or diversion of the rotor masts 122, 124 during rotation of the rotor masts 122, 124, produces vibration in the rotor systems 112, 116 that potentially translate to the fuselage 102 of coaxial helicopter 100. By individually addressing the in-plane rotor loads acting on each rotor system 112, 116 through selective operation of the vibration reduction systems 130, 140, in-plane rotor loads and resulting vibrations can be controlled and reduced to improve comfort to aircrew and passengers and before they combine to potentially cause damage or catastrophic failure of one or more components of the main rotor system 110.

Each vibration reduction system 130, 140 generally comprises a vibration attenuator (e.g., rotating sprung mass assembly) that rotates with each associated rotor mast 122, 124 or relative to a fixed standpipe. In some embodiments, the vibration attenuator of each vibration reduction system 130, 140 may generally include a housing, in which a mass component is biased towards a resting position by a biasing component. The vibration attenuator orbits in response to the N/REV vibrations in the associated rotor mast 122, 124, which is a higher rotational frequency than the 1/REV rotational motion of the rotor masts 122, 124. In embodiments comprising a biasing component, the biasing component is selected to allow for self-excitation of the mass component at a desired N/REV frequency, resulting in the mass component self-positioning between inner and outer radial positions with respect to each rotor mast 122, 124 in order to counteract the magnitude of the N/REV vibrations of each rotor mast 122, 124. Alternatively, the vibration attenuator may be selectively radially positioned by a control system of coaxial helicopter 100. This results in a steady state extension and contraction motion to position the vibration attenuator and creates a counter vibration that attenuates or reduces the N/REV vibrations in each rotor mast 122, 124. Thus, the vibrations in each rotor system 112, 116 maintain an approximately steady state magnitude and phase that is only affected by changes in the flight path of the aircraft.

While not shown, coaxial helicopter 100 also comprises pilot controls (e.g., cyclic control) for receiving inputs from a pilot or co-pilot to operate the coaxial helicopter 100, and a flight control system, which may, for example, include hardware and/or software for controlling the coaxial helicopter 100 in flight. In some embodiments, each vibration reduction system 130, 140 may comprise one or more feedback sensors located on the fuselage 102, rotor hubs 113, 117, rotor masts 122, 124, and/or other components of the main rotor system 110 or coaxial helicopter 100, to provide vibration feedback data to the flight control system. As such, pilot or co-pilot inputs via the pilot controls and/or automatic responses from the flight control system may operate the vibration reduction systems 130, 140 to provide vibration reduction to the rotor systems 112, 116 by controlling operational parameters of the vibration reduction systems 130, 140, including, but not limited to, positioning of the mass components of the vibration reduction systems 130, 140 and/or phasing of the mass components of the vibration reduction systems 130, 140 relative to the position of the rotor masts 122, 124. Furthermore, in implementing vibration control and reduction through the vibration reduction systems 130, 140, the frequencies and amplitudes of the vibration reduction systems 130, 140 and the rotor systems 112, 116 should be substantially similar or preferably equal magnitude to keep displacement of the rotor masts 122, 124 at or near zero.

FIGS. 2 through 7 illustrate oblique views of exemplary embodiments of vibration reduction systems 200, 300, 400, 500, 600, 700, respectively. Vibration reduction systems 130, 140, also referred to as a damper system or attenuation system, may be, for example, one of vibration reduction systems 200, 300, 400, 500, 600, 700. In some embodiments, vibration reduction systems 130, 140 of coaxial helicopter 100 may comprise the same vibration reduction system. However, in alternative embodiments, vibration reduction systems 130, 140 of coaxial helicopter 100 may comprise different vibration reduction systems. Vibration reduction systems 200, 300, 400, 500, 600 are disclosed in International Patent Application No. PCT/US17/22380, the disclosure of which is hereby incorporated by reference in its entirety. Vibration reduction assembly 700 is disclosed in U.S. Provisional Patent Application No. 62/634,896, the disclosure of which is also hereby incorporated by reference in its entirety. Further, while exemplary embodiments of a vibration reduction system 200, 300, 400, 500, 600, 700 are disclosed, it will be appreciated that vibration reduction systems 130, 140 may be any active or passive spinning mass vibration control system, and/or comprise any combination of components or systems disclosed herein.

Figure 8:
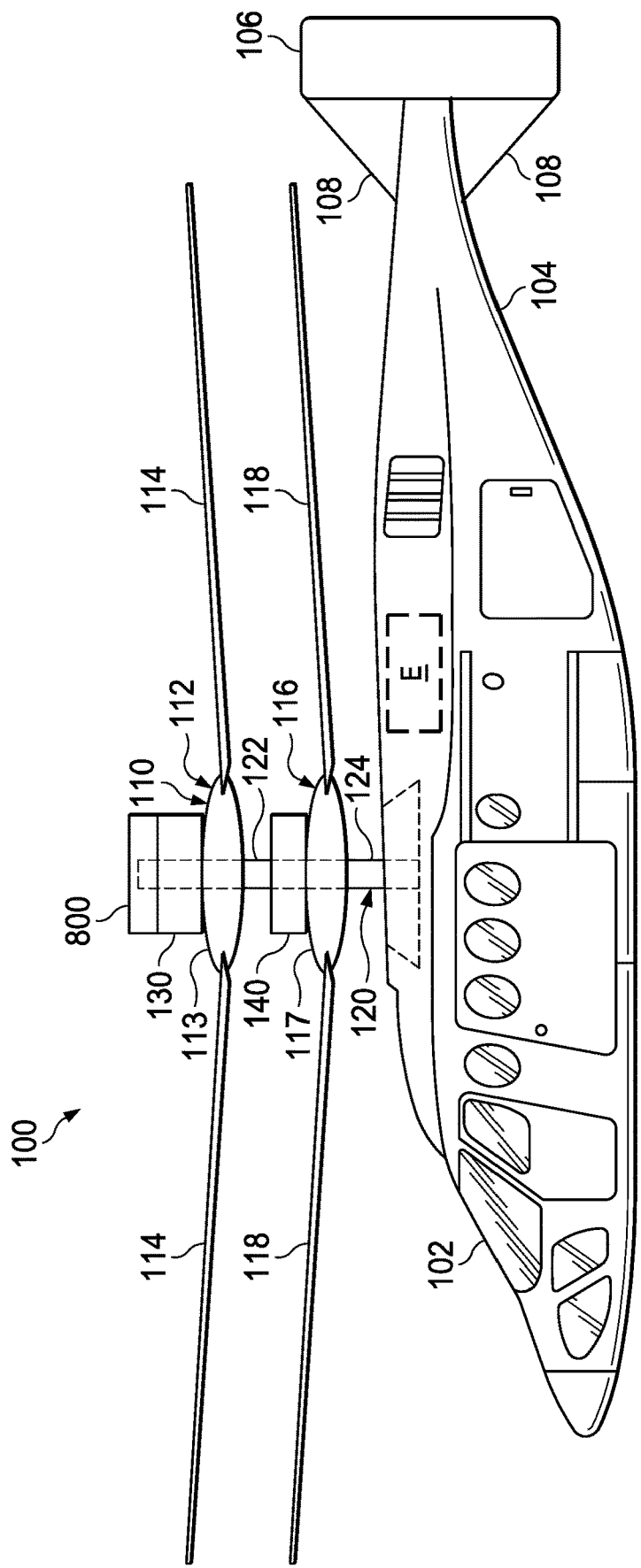
FIG. 8 is a side view of an alternative embodiment of a coaxial helicopter.

FIG. 8 is a side view of an alternative embodiment of coaxial helicopter 100 according to this disclosure. Similar to the embodiment of coaxial helicopter 100 shown in FIG. 1, upper vibration reduction system 130 is located above the rotor hub 113 of the upper rotor system 112 and is configured to provide in-plane vibration control and reduction to the upper rotor system 112, while lower vibration reduction system 140 is located above the rotor hub 117 of the lower rotor system 116 and is configured to provide in-plane vibration control and reduction to the lower rotor system 116. However, in the embodiment shown, coaxial helicopter 100 comprises a third vibration reduction system 800. In some embodiments, vibration reduction system 800 may be substantially similar to one or more vibration reduction systems 130, 140, 200, 300, 400, 500, 600, 700. However, in alternative embodiments, vibration reduction system 800 may be different from vibration reduction systems 130, 140, 200, 300, 400, 500, 600, 700 and comprise any active or passive spinning mass vibration control system, and/or comprise any combination of components or systems disclosed herein.

Vibration reduction system 800 is generally configured to cooperate with vibration reduction systems 130, 140 to provide in-plane vibration control and reduction to the main rotor system 110. In some embodiments, vibration reduction system 800 may function as a redundant system in the event of failure of one of vibration reduction systems 130, 140. While upper vibration reduction system 130 specifically provides in-plane vibration control and reduction to upper rotor system 112, and lower vibration reduction system 140 specifically provides in-plane vibration control and reduction to lower rotor system 116, some residual in-plane vibration may still be present. Accordingly, in some embodiments, vibration reduction system 800 may be configured to address the residual in-plane vibration and provide residual vibration control and reduction in the main rotor system 110. In some embodiments, the vibration reduction system 800 may be configured to address in-plane vibration that occurs at a known or desired harmonic frequency and provide vibration control and reduction in the main rotor system 110 that occurs at such known or desired harmonic frequencies. Thus, in some embodiments, vibration reduction system 800 may address in-plane vibrations that occur at such known or desired harmonic frequencies prior to engaging vibration reductions systems 130, 140. Further, in the embodiment shown, vibration reduction system 800 is located above the rotor hub 113 of the upper rotor system 112 and the upper vibration reduction system 130 and coupled to the rotor mast assembly 120. However, in this embodiment, vibration reduction system 800 may be coupled directly to the upper rotor mast 122 or a fixed standpipe associated with the upper rotor mast 122.

Figure 9:
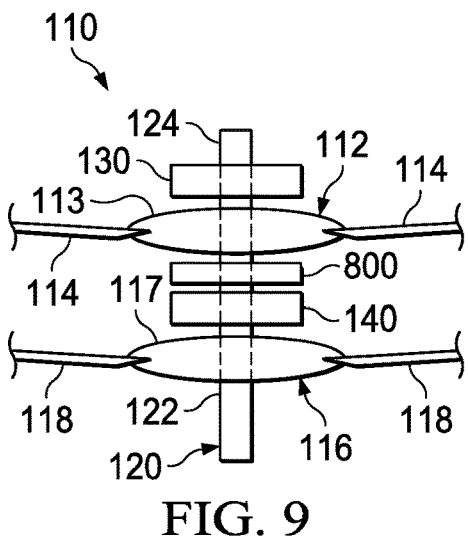
FIGS. 9 through 19 are side views of alternative embodiments of a rotor system of the coaxial helicopter of FIG. 8.
Figure 10:
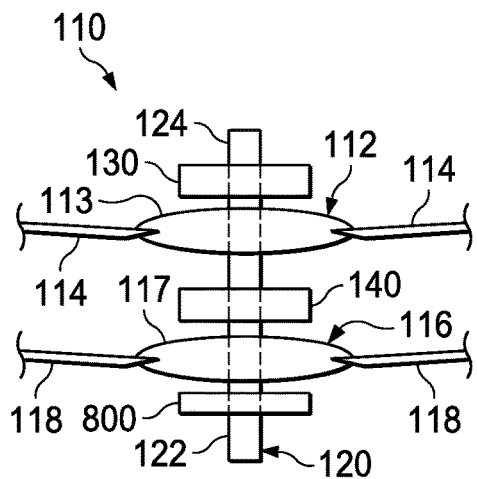

FIGS. 9 through 19 illustrate side views of alternative embodiments of the rotor system 110 of the coaxial helicopter 100 of FIG. 8. As shown in FIG. 9, upper vibration reduction system 130 is located above the rotor hub 113 of the upper rotor system 112, lower vibration reduction system 140 is located above the rotor hub 117 of the lower rotor system 116, and vibration reduction system 800 is located between the rotor hubs 113, 117 of the rotor systems 112, 116. As shown in FIG. 10, upper vibration reduction system 130 is located above the rotor hub 113 of the upper rotor system 112, lower vibration reduction system 140 is located above the rotor hub 117 of the lower rotor system 116, and vibration reduction system 800 is located below the rotor hub 117 of the lower rotor system 116.

Figure 11:
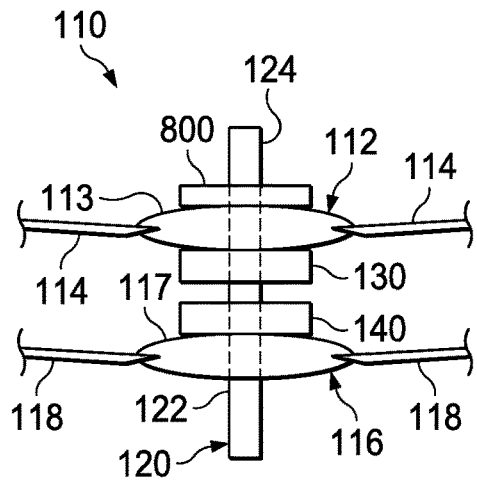
Figure 12:
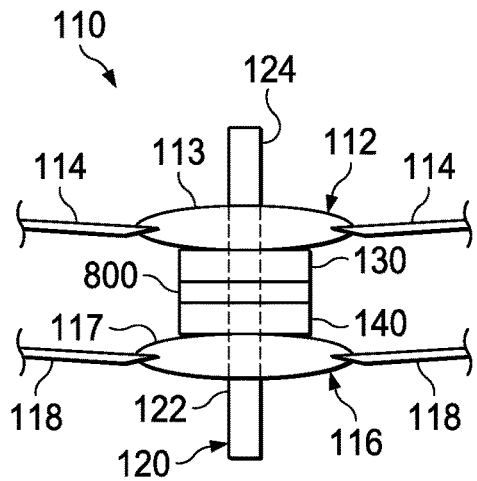
Figure 13:
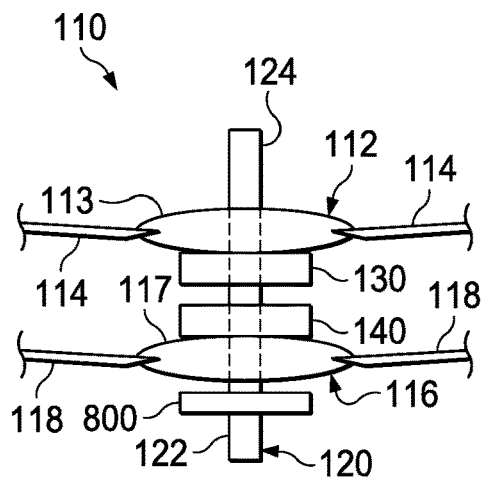

As shown in FIG. 11, upper vibration reduction system 130 is located below the rotor hub 113 of the upper rotor system 112, lower vibration reduction system 140 is located above the rotor hub 117 of the lower rotor system 116, and vibration reduction system 800 is located above the rotor hub 113 of the upper rotor system 112. As shown in FIG. 12, upper vibration reduction system 130 is located below the rotor hub 113 of the upper rotor system 112, lower vibration reduction system 140 is located above the rotor hub 117 of the lower rotor system 116, and vibration reduction system 800 is located between the rotor hubs 113, 117 of the rotor systems 112, 116. As shown in FIG. 11, upper vibration reduction system 130 is located below the rotor hub 113 of the upper rotor system 112, lower vibration reduction system 140 is located above the rotor hub 117 of the lower rotor system 116, and vibration reduction system 800 is located below the rotor hub 117 of the lower rotor system 116.

Figure 14:
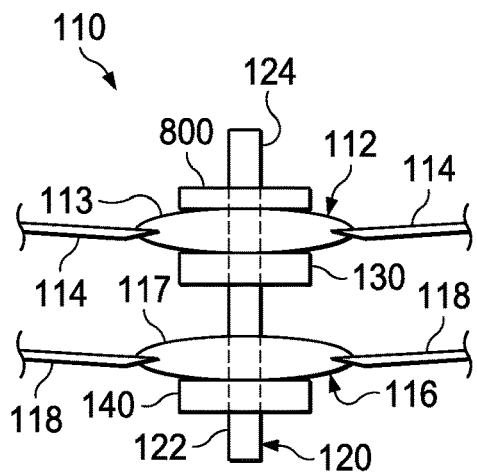
Figure 15:
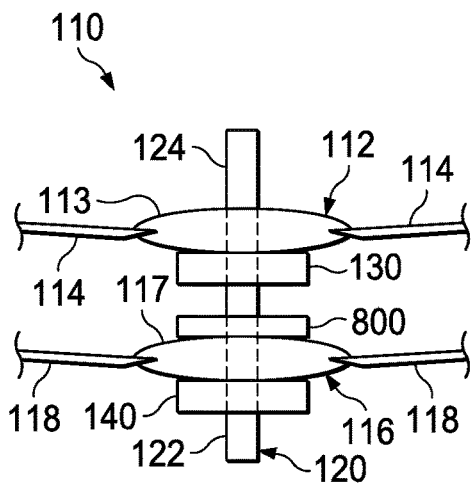
Figure 16:
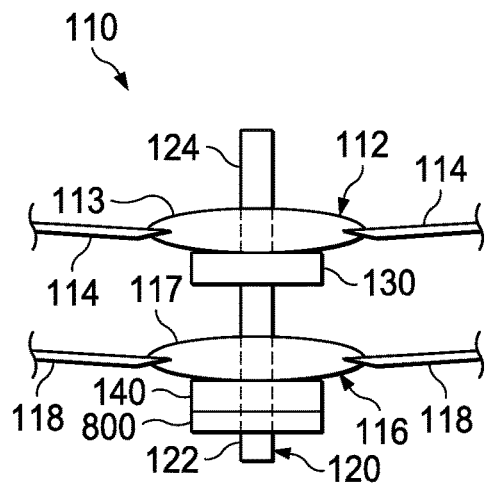

As shown in FIG. 14, upper vibration reduction system 130 is located below the rotor hub 113 of the upper rotor system 112, lower vibration reduction system 140 is located below the rotor hub 117 of the lower rotor system 116, and vibration reduction system 800 is located above the rotor hub 113 of the upper rotor system 112. As shown in FIG. 15, upper vibration reduction system 130 is located below the rotor hub 113 of the upper rotor system 112, lower vibration reduction system 140 is located below the rotor hub 117 of the lower rotor system 116, and vibration reduction system 800 is located between the rotor hubs 113, 117 of the rotor systems 112, 116. As shown in FIG. 16, upper vibration reduction system 130 is located below the rotor hub 113 of the upper rotor system 112, lower vibration reduction system 140 is located below the rotor hub 117 of the lower rotor system 116, and vibration reduction system 800 is located below the rotor hub 117 of the lower rotor system 116.

Figure 17:
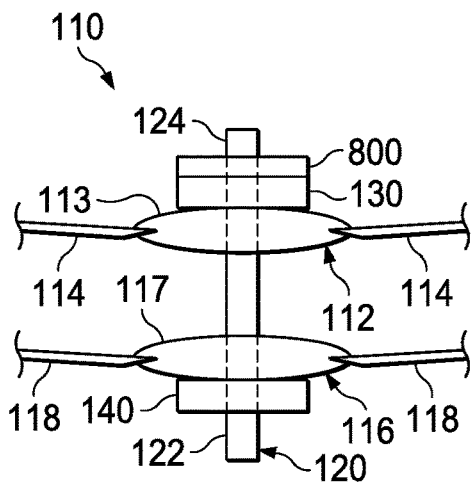
Figure 18:
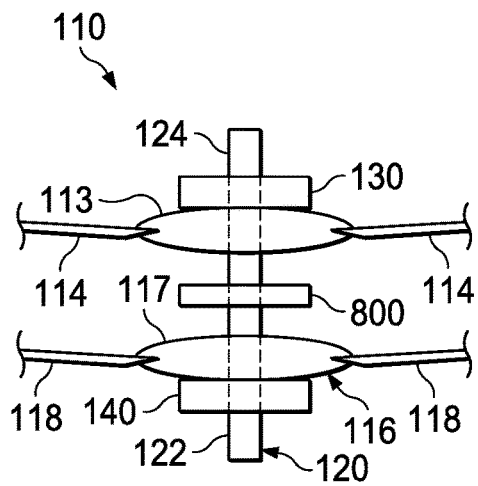
Figure 19:
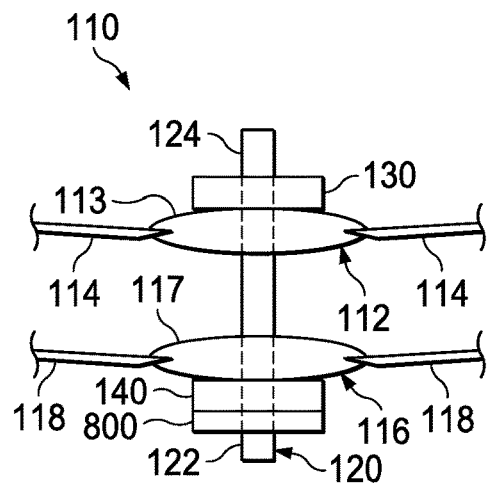

As shown in FIG. 17, upper vibration reduction system 130 is located above the rotor hub 113 of the upper rotor system 112, lower vibration reduction system 140 is located below the rotor hub 117 of the lower rotor system 116, and vibration reduction system 800 is located above the rotor hub 113 of the upper rotor system 112. As shown in FIG. 18, upper vibration reduction system 130 is located above the rotor hub 113 of the upper rotor system 112, lower vibration reduction system 140 is located below the rotor hub 117 of the lower rotor system 116, and vibration reduction system 800 is located between the rotor hubs 113, 117 of the rotor systems 112, 116. As shown in FIG. 19, upper vibration reduction system 130 is located above the rotor hub 113 of the upper rotor system 112, lower vibration reduction system 140 is located below the rotor hub 117 of the lower rotor system 116, and vibration reduction system 800 is located below the rotor hub 117 of the lower rotor system 116.

It will be appreciated that vibration reduction system 800 may be located above the rotor hub 113 of the upper rotor system 112, between the rotor hubs 113, 117 of the rotor systems 112, 116, and below the rotor hub 117 of the lower rotor system 116 so long as the upper vibration reduction system 130 is adjacently located to its respective rotor hub 113, and the lower vibration reduction system 140 is adjacently located to its respective rotor hub 117. Vibration reduction system 800 is generally coupled to the rotor mast assembly 120. However, in the embodiments of FIGS. 9, 11, 12, 14, 15, 17, and 18, vibration reduction system 800 may be coupled directly to the upper rotor mast 122. In the embodiments of FIGS. 9, 10, 12, 13, 15, 16, 18, and 19, the vibration reduction system 800 may be coupled directly to the lower rotor mast 124. However, in other embodiments, vibration reduction system 800 may comprise multiple rotating sprung mass assemblies, one rotating sprung mass assembly associated with and coupled to each rotor mast 122, 124, in order to provide in-plane vibration control and reduction to the main rotor system 110.

Figure 20:
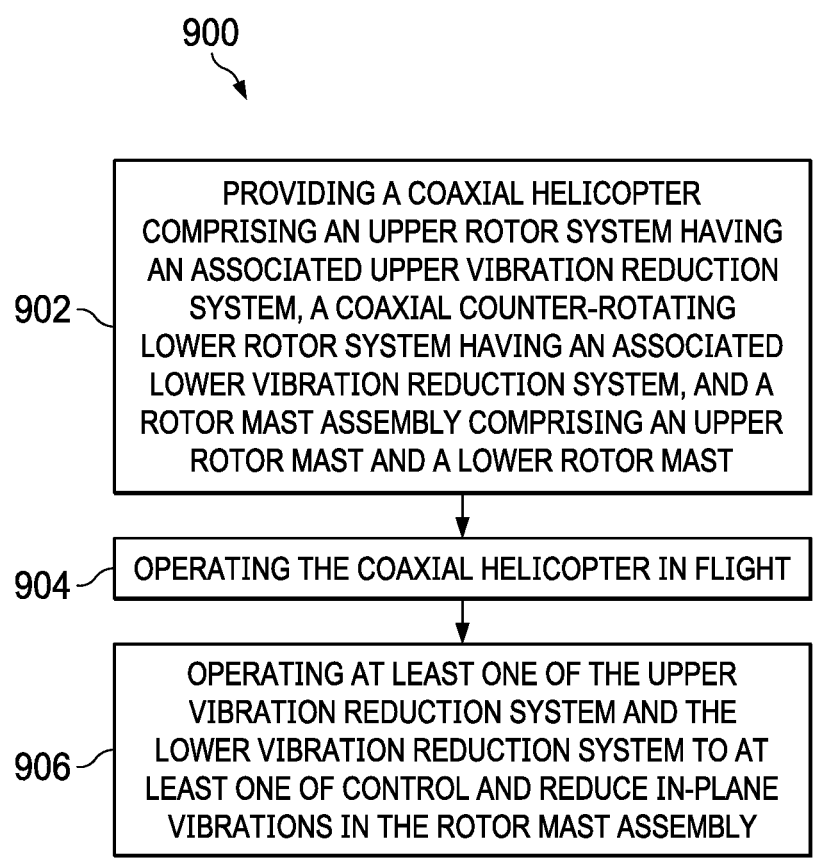
FIG. 20 is a flowchart of a method of operating a coaxial helicopter.

FIG. 20 is a flowchart of a method 900 of operating a coaxial helicopter 100 according to this disclosure. Method 900 begins at block 902 by providing a coaxial helicopter 100 comprising an upper rotor system 112 having an associated upper vibration reduction system 130, a coaxial counter-rotating lower rotor system 116 having an associated lower vibration reduction system 140, and a rotor mast assembly 120 comprising an upper rotor mast 122 and a lower rotor mast 124. The upper rotor system 112 and the associated upper vibration reduction system 130 are coupled to and rotate with the upper rotor mast 122. The lower rotor system 116 and the associated lower vibration reduction system 140 are coupled to the lower rotor mast 124. Method 900 continues at block 904 by operating the coaxial helicopter 100 in flight. Coaxial helicopter 100 may be operated in forward flight, rearward flight, right or left sideward flight, or hover.

Method 900 concludes at block 906 by operating at least one of the upper vibration reduction system 130 and the lower vibration reduction system 140 to at least one of control and reduce in-plane vibrations in the rotor mast assembly 120. The upper vibration reduction system 130 provides in-plane vibration control and reduction to the upper rotor system 112. The lower vibration reduction system 140 provides in-plane vibration control and reduction to the lower rotor system 116. In some embodiments, this may be accomplished in response to detection of an in-plane rotor load acting on one of the rotor systems 112, 116, movement of a one of the rotor masts 122, 124 or diversion of one of the rotor masts 122, 124 from its respective rotational axes, or vibration in one of the rotor systems 112, 116 by one or more feedback sensors located on a fuselage 102, rotor hubs 113, 117, rotor masts 122, 124, and/or other components of the main rotor system 110 or coaxial helicopter 100, and subsequent communication of vibration feedback data to the flight control system.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A coaxial helicopter, comprising:
    a fuselage; and
    a main rotor system, comprising:
        a rotor mast assembly comprising an upper rotor mast and a coaxial counter-rotating lower rotor mast;
        an upper rotor system comprising an upper rotor hub configured to couple a plurality of rotor blades to the upper rotor mast for selective rotation therewith, and an upper vibration reduction system comprising an upper vibration attenuator coupled to the upper rotor mast, the upper vibration attenuator being configured for selective rotation relative to the upper rotor hub and disposed adjacently to the upper rotor hub; and
        a coaxial counter-rotating lower rotor system comprising a lower rotor hub configured to couple a plurality of rotor blades to the lower rotor mast for selective rotation therewith, and a lower vibration reduction system comprising a lower vibration attenuator coupled to the coaxial counter-rotating lower rotor mast, the lower vibration attenuator being configured for selective rotation relative to the lower rotor hub and disposed adjacently to the lower rotor hub.

2. The coaxial helicopter of claim 1, wherein the upper vibration reduction system and the lower vibration reduction system are configured to provide in-plane vibration control and reduction to the main rotor system.

3. The coaxial helicopter of claim 2, wherein the upper vibration reduction system provides in-plane vibration control to the upper rotor system, and wherein the lower vibration reduction system provides in-plane vibration control to the lower rotor system.

4. The coaxial helicopter of claim 3, wherein the upper vibration reduction system is located above the upper rotor hub, and wherein the lower vibration reduction system is located above the lower rotor hub.

5. The coaxial helicopter of claim 3, wherein the upper vibration reduction system is located above the upper rotor hub, and wherein the lower vibration reduction system is located below the lower rotor hub.

6. The coaxial helicopter of claim 3, wherein the upper vibration reduction system is located below the upper rotor hub, and wherein the lower vibration reduction system is located above the lower rotor hub.

7. The coaxial helicopter of claim 3, wherein the upper vibration reduction system is located below the upper rotor hub, and wherein the lower vibration reduction system is located below the lower rotor hub.

8. The coaxial helicopter of claim 1, further comprising: a third vibration reduction system.

9. The coaxial helicopter of claim 8, wherein the third vibration reduction system cooperates with the upper vibration reduction system and the lower vibration reduction system to provide in-plane vibration control to the main rotor system.

10. The coaxial helicopter of claim 9, wherein the third vibration reduction system is configured to control residual in-plane vibration not attenuated by the upper vibration reduction system and the lower vibration reduction system.

11. The coaxial helicopter of claim 9, wherein the third vibration reduction system is configured to control in-plane vibration that occurs at a known harmonic frequency.

12. The coaxial helicopter of claim 9, wherein the third vibration reduction system is located above the upper rotor hub.

13. The coaxial helicopter of claim 9, wherein the third vibration reduction system is located between the upper rotor hub and the lower rotor hub.

14. The coaxial helicopter of claim 9, wherein the third vibration reduction system is located below the lower rotor hub.

15. A coaxial main rotor system, comprising:
    a rotor mast assembly comprising an upper rotor mast and a coaxial counter-rotating lower rotor mast;
    an upper rotor system comprising an upper rotor hub configured to couple a plurality of rotor blades to the upper rotor mast for selective rotation therewith, and an upper vibration reduction system comprising an upper vibration attenuator coupled to the upper rotor mast, the upper vibration attenuator being configured for selective rotation relative to the upper rotor hub and disposed adjacently to the upper rotor hub; and
    a coaxial counter-rotating lower rotor system comprising a lower rotor hub configured to couple a plurality of rotor blades to the lower rotor mast for selective rotation therewith, and a lower vibration reduction system comprising a lower vibration attenuator coupled to the coaxial counter-rotating lower rotor mast, the lower vibration attenuator being configured for selective rotation relative to the lower rotor hub and disposed adjacently to the lower rotor hub.

16. The coaxial main rotor system of claim 15, further comprising: a third vibration reduction system.

17. The coaxial main rotor system of claim 15, wherein the upper vibration reduction system provides in-plane vibration control to the upper rotor system, wherein the lower vibration reduction system provides in-plane vibration control to the lower rotor system, and wherein the third vibration reduction system cooperates with the upper vibration reduction system and the lower vibration reduction system to provide in-plane vibration control to the main rotor system.

18. A method of operating an aircraft, comprising:
    providing a coaxial helicopter comprising an upper rotor system having an associated upper vibration reduction system comprising an upper vibration attenuator configured to provide in-plane vibration control to the upper rotor system, and a coaxial counter-rotating lower rotor system having an associated lower vibration reduction system comprising a lower vibration attenuator configured to provide in-plane vibration control to the upper rotor system;
    operating the coaxial helicopter in flight;
    operating the upper vibration reduction system to control in-plane vibration in the upper rotor system and the lower vibration reduction system to control in-plane vibration in the lower rotor system.

19. The method of claim 18, wherein the operating the upper vibration reduction system to control in-plane vibration in the upper rotor system and the lower vibration reduction system to control in-plane vibration in the lower rotor system is accomplished in response to detection of an in-plane rotor load acting on at least one of the upper rotor system and the lower rotor system.

20. The method of claim 19, wherein the coaxial helicopter comprises a third vibration reduction system configured to control residual in-plane vibration not controlled by the upper vibration reduction system and the lower vibration reduction system.

* * * * *